July 15, 1947.  T. F. PETERSON  2,423,902
HIGH FREQUENCY ELECTRIC FIELD HEATING APPARATUS
Filed July 21, 1943  4 Sheets-Sheet 1

INVENTOR.
Thomas F. Peterson

BY *signature*
ATTORNEY

July 15, 1947. T. F. PETERSON 2,423,902
HIGH FREQUENCY ELECTRIC FIELD HEATING APPARATUS
Filed July 21, 1943 4 Sheets-Sheet 2
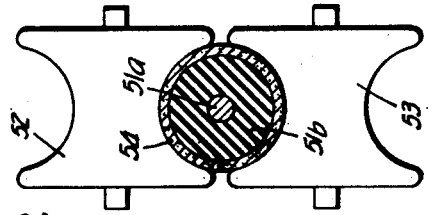
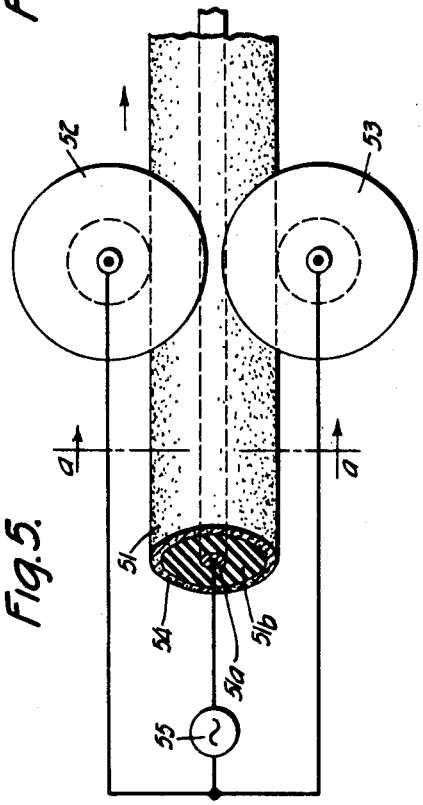
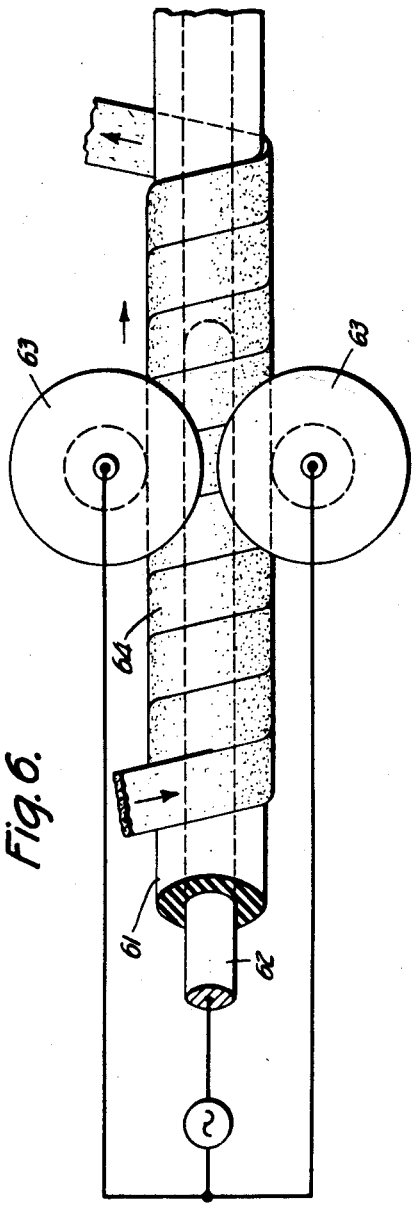
INVENTOR.
Thomas F. Peterson
BY Jos. N. Nielsen
ATTORNEY

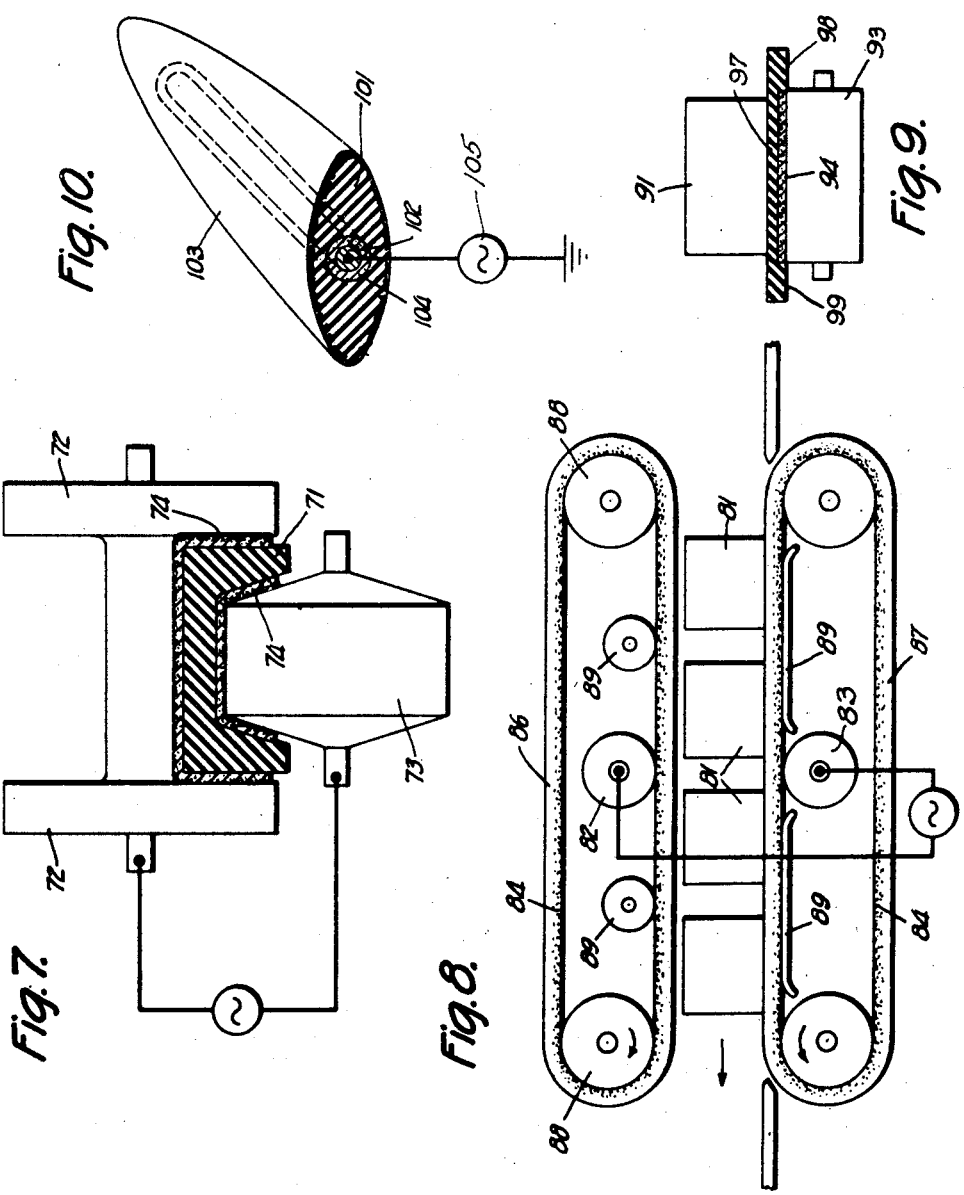

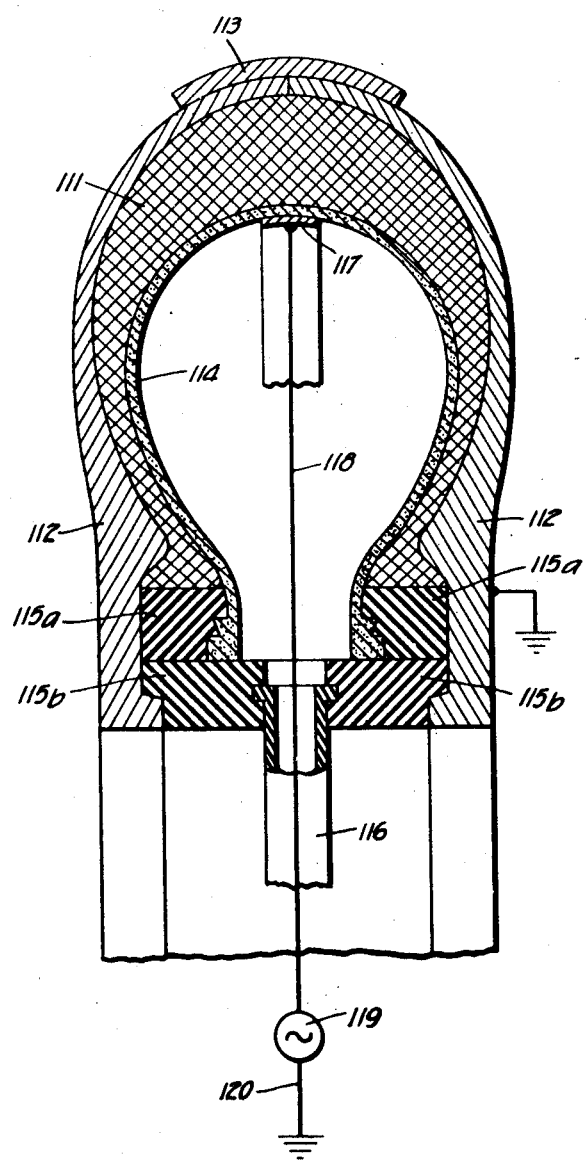

UNITED STATES PATENT OFFICE 2,423,902

HIGH-FREQUENCY ELECTRIC FIELD HEATING APPARATUS

Thomas F. Peterson, Shaker Heights, Ohio, assignor of one-fifth to Joseph N. Nielsen, New York, N. Y.

Application July 21, 1943, Serial No. 495,559

12 Claims. (Cl. 219—47)

This invention relates to electrodes for impressing electrostatic fields upon insulating or dielectric materials. Such fields, particularly at high frequencies of the order of megacycles per second, have been found useful for heating materials, such as wood, rubber and synthetic resin compositions, that are poor conductors thermally as well as electrically. It is primarily to the heating application of electrostatic fields that the present invention is directed, tnd it is hereinafter described with that object in view.

The principle, upon which the heating depends, is that no material is a perfect dielectric; the best insulators will pass at least infinitesimal "conduction currents" when a direct potential difference is applied. Alternating potential differences cause the flow through the insulation of charging currents proportional to the specific inductive capacity (S. I. C.) of the insulation, the voltage and the frequency impressed; but because of the imperfect nature of a dielectric, some portion of a charging current is in phase with the voltage and represents a resistance leakage or dielectric loss (measured by the power factor of the insulating material) which may increase with high frequencies and appears as heat in the material. Though the power input that appears as heat is theoretically proportional to the square of the effective voltage and only to the first power of the frequency, the voltages that can be applied in following the known practices are generally not much above 15,000 volts while practical frequencies range from 100 kilocycles to 100 megacycles and even thousands of megacycles are possible.

By resorting to a high frequency field, heat is generated simultaneously and uniformly within all parts of the body of the insulation, provided the field is uniform, the material is homogeneous and there are no heat losses. This means that the time required to reach a temperature within the body is independent of the thickness of the dielectric; for instance, this is shown by a rise in a dielectric of wood 2 inches thick between metal plate electrodes to a temperature of 280° F. at the center in about 4 minutes with an energy input of 5 watts per cubic inch at about 8 megacycles. These effects are in marked contrast to those of externally-applied heating, as by means of hot press-platens or ovens, and dependent upon conduction through the material from the outside surfaces; for example, with a dielectric of wood having a thickness of 2 inches between heated metal platens, it takes about an hour for the center portion to reach a temperature of 270° F. with heat applied at a temperature of 300° F. to the outside surface.

There are, however, some limiting factors upon the application of high frequency heating. It is necessary that the electrodes be properly insulated to prevent a "short" forming across them. The shape of the electrodes and the spacing between them for even distribution of heating requires that each elemental path from electrode to electrode have the same impedance as all other such paths; if, however, a portion of the path is in air, which offers a much higher resistance per unit length, there is not only a useless waste of energy but it becomes necessary to compensate for the higher resistance of the path in air by modifying the spacing of the electrodes. The danger of voltage flash-over places a limitation on the thinness of the dielectric, and even with thicknesses of an inch or more there is a limit upon the voltage (15,000 volts) beyond which it is undesirable to go because of corona effects. There are also heat-losses, particularly conduction losses to cold electrodes and convection and radiation from the electrodes, which place a minimum on the power input rate; these heat losses become particularly marked when the dielectric layer is thin. Moreover, the power factors of many insulating materials rises quite rapidly with increasing temperature, and this contributes to the non-uniformity of temperature within the insulating body; to thermally insulate the electrodes in order to improve the temperature distribution is a disadvantage and complicates the making of suitable electrical contacts with the body to be heated.

The present invention provides a controlled heat distribution throughout a body when heated by high frequency, which distribution is not limited to a uniform heating but can be given a predetermined variation in different sections of the dielectric material; for instance the heat application can be distributed so as to cause a gradation of temperature in any particular cross-section or portion or to cause varying temperatures in different portions or cross-sections of a dielectric. The distribution so provided, moreover, eliminates danger of flash-over at high voltages and limitation to thick sections; and heat-losses are minimized. It furthermore provides for treating sheets, tubes, rods or other shapes that pass continuously through an electrostatic field, and preferably a field of progressively increasing intensity so as to bring a cross-section of the dielectric up to the desired temperature as that cross-section enters and passes through the field. In addition it provides an improved surface contact with the dielectric to minimize the waste of energy.

The invention accommodates the foregoing improvements by providing for an electrode a combination of two elements: (1) a primary element of good conductivity, such as a metal plate, connected to a source of high frequency, and (2) a secondary element of semi-conductivity or high dielectric-loss material, extending from the primary element and over the surface of the relatively low-loss dielectric to be heated. The secondary element can form part of the dielectric being treated as an integral outside layer; or it can be a coating secured to the surface or a layer laid in separable contact with the surface. In addition a grading of heat generated within the body is made possible by providing a graded semi-conducting element as a layer of the body, the layer having for instance decreasing dielectric loss from the surface toward the interior; in this way a greater part of the heat can be generated at the surface to compensate for heat losses by conduction and radiation.

By the inclusion of a secondary semi-conductive element as a part of an electrode there is combined (1) a large contact area between the electrode and the dielectric to be heated and at the same time (2) a resistance that represents increased loss or heat-generation. The effectiveness of the invention in these respects is brought out by some test data obtained with a piece of cable 7 inches long; the cable has a central conductor of fine strands and a diameter of .046 inch, insulated with a low loss dielectric rubber (60% crude by weight of the rubber compound) $\frac{1}{32}$ inch thick, and a wind of glass fiber. Over the insulation was a tinned copper braid; when the copper braid was grounded and the conductor was connected to an energy source operating at 7.126 megacycles, a capacity reading of 25.0 micro-micro-farads and a conductance reading of 36.3 micromhos per 7 inches were obtained; from this data the power factor can be calculated as $$\frac{I_R}{I_{charging}} = \frac{E \cdot mhos}{E \cdot 2\pi f C} = \frac{36 \cdot 10^{-6}}{2\pi \cdot 7 \cdot 10^6 \cdot 25 \cdot 10^{-12}} = 3.3\%$$

The copper braid was removed and replaced by a layer of semi-conducting tape, made by coating a cotton fabric with a semi-conducting compound of an alkyd resin and acetylene black, and at 60 cycles the surface resistance of the tape was 450 ohms per inch per inch, or at 7.126 megacycles a 0.5 inch width of the tape, 4.25 inches in length, had a capacity of 0.5 micro-micro-farad and conductance of 600 micromhos, equivalent to a resistance of 190 ohms per inch per inch; about the tape were one or more grounds, each consisting of a single turn of wire, at various locations, and when the same high frequency energy was applied the following data was obtained:

| Ground | Capacity | Conductance |
|---|---|---|
| | Mmf./7 in. | Mm./7 in. |
| Near one end only | 8.0 | 278 |
| Middle only | 8.9 | 428 |
| Both ends | 13.3 | 463 |
| Both ends and middle | 26.5 | 658 |

Comparing the foregoing with the capacity of the rubber insulation and glass winding between metal electrodes of 25.0 mmf. and conductance of 36.3 mm., it is noted that with a single end ground contact on the semi-conducting tape the capacity was about one-third of the 7 inch cable capacity, thereby indicating an effective equivalent distribution over one-third the length of the cable; a charging current, however, flowed over a resistance, and the higher conductance (lower resistance), shown by the micromho reading, indicated a greater current flow under the applied voltage and consequent increased heating. When both ends and the middle were grounded, the full capacity of the cable was realized, but the conductance was about 20 times that when a copper braid was used, and the power factor calculates to more than 50 per cent; of the 658 micromhos, 36 represented the proportion of loss in the rubber insulation and 622 the proportion developed in the semi-conducting tape. The data accordingly conclusively establishes that a very desirable type of contact can be obtained by means of a semi-conducting element extending over the surface of the dielectric from a primary conductive electrode with a generation of heat in that element for transfer to the dielectric being heated or to compensate for heat dissipation. The effects are controlled by the resistivity of the semi-conducting element, relative losses in the element and the dielectric, capacity per unit length, etc.

Materials suitable for the primary element of an electrode combination are those characterized by good electrical conductivity, that is, by low volume resistance, generally measured in microhms per $cm.^3$; examples of these are the metals, conductive carbon (such as acetylene black), graphite, etc. Dielectrics, on the other hand, have high volume resistivities of the order of millions of megohms per $cm.^3$; instances are resins, resin- or oil- or wax-impregnated paper or fabric, elastomers (such as rubber, synthetic rubbers, plasticized resins, etc.) wood, waxes, etc. For the secondary element of an electrode combination, materials of semi-conductive nature or intermediate surface resistivity ranging from about one or more ohms to about 100 megohms per centimeter per centimeter are suitable; they can be obtained by including finely subdivided conductive material in a dielectric to the extent giving the desired resistance. Semi-conductivity can be imparted to a dielectric, for instance, by embedding conductive particles in the dielectric surface as by frictioning or rubbing the particles into the dielectric; or by mixing the particles with the dielectric, as by milling conductive carbon black in rubber; or by dispersing the particles in a solution of the dielectric to form a liquid coating composition or to form a paste for knife coating or for calendering. As a powder, solution or paste, the semi-conductive material can be impregnated into or coated on a paper, fabric, sheet rubber, rubberized tape, resin film or other base; and the so-treated base can form the secondary element, either as a layer separable from the dielectric being heated or as an integral or adherent part of the dielectric.

In the accompanying drawing:

Fig. 5 is a view showing an application of the invention to the heat-treating of cable insulation;

Fig. 5a is a cross-section on the line a—a of Fig. 5;

Fig. 6 is a view similar to Fig. 5 applying the invention to the heat-treating of tubes;

Fig. 7 illustrates in cross-section the heat-treating of a shaped strip;

Fig. 8 shows in longitudinal section a conveying system embodying the invention for heat-treating bodies carried by the system;

Fig. 9 illustrates in vertical cross-section a modification providing edge insulation against flash-over;

Fig. 10 illustrates an embodiment with an embedded primary electrode element in conjunction with a secondary element; and Fig. 11 is a cross-section of an embodiment illustrating the heat-treating of a hollow closed structure with internal and external electrodes.

Figure 1:
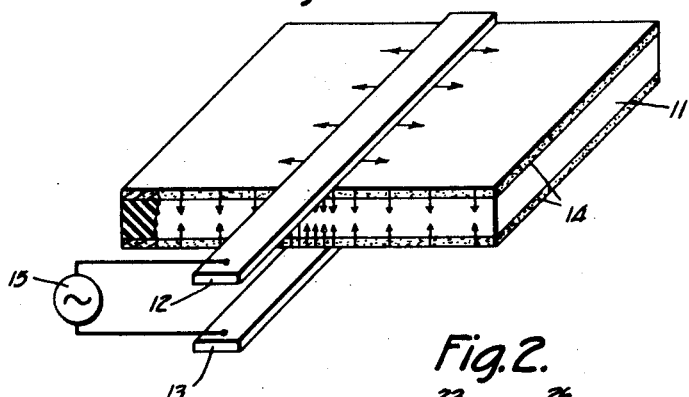
Fig. 1 shows in perspective an embodiment with a pair of electrodes, each consisting of primary and secondary elements, applied to a dielectric to be heated.

In the embodiment shown in Fig. 1, the dielectric or insulating material 11 to be heated is placed between metal strip primary electrode elements 12 and 13; for the strips there can be substituted wires, plates, rolls, etc. Interposed between each conductive element and the surface of the dielectric is a secondary electrode element or layer 14 of semi-conducting nature, and shown as a surfacing layer or coating adherent to each surface of the dielectric. The strip elements are connected to a high frequency source 15.

When a high frequency electrostatic field is applied to the embodiment of Fig. 1 current flows laterally from the strips along the surfaces of the layers 14 and thence through the material 11 as indicated by the arrows. The lateral current flow along the surfaces 14 is of decreasing strength away from the strips, in correspondence to the semi-conductive value of the layers 14, and then transversely through the material 11; consequently there is a decreasing heating effect within the material 11 as the distance from the strips 12, 13 increases. By a proper choice of resistivity for the layers 14, losses can be generated in them to compensate for heat-radiation or heat-conduction losses and thus improve or control the heat distribution in the body 11.

Figure 2:
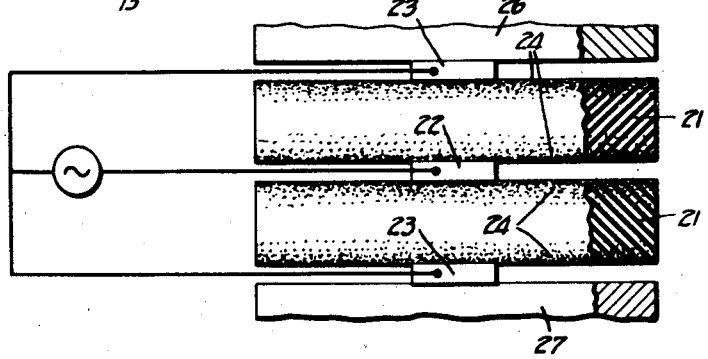
Fig. 2 shows in a vertical cross-section an embodiment including graded secondary electrode elements.

The modification of Fig. 2 illustrates a secondary electrode element 24 as a layer forming part of the body 21 to be heated in conjunction with each of the primary strip electrode elements 22, 23. Pressure can be applied by means of press-platens 26, 27; to avoid insulation problems, the body 21 is shown in duplicate with a primary electrode element 22 and coacting surfacing secondary elements 24 between the two bodies.

A layer 24 of Fig. 2 can be graded so as to have decreasing semi-conductivity or dielectric loss toward the interior of the body 21 as shown by the distribution of conductive particles; by this means the heating is greatest at the outside surface, and the layer can be given such variation of conductivity as to cause a uniform temperature within the body by the compensating feature of decreasing density losses in the direction toward the interior.

Figure 3:
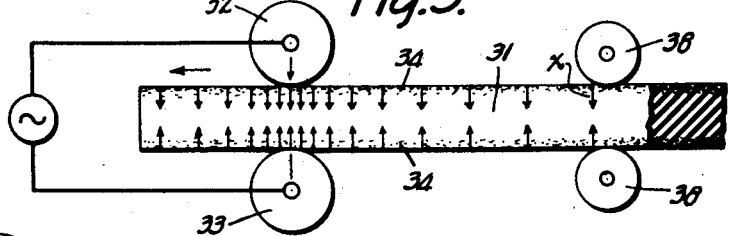
Fig. 3 is a vertical cross section of an embodiment similar to Fig. 1, but illustrating primary roll electrode elements for a continuous operation and secondary electrode elements as surfacing layers of the dielectric being treated.

The embodiment in Fig. 3 is adapted for a continuous pressing operation. For this purpose, metal rolls 32, 33 take the place of the press-platens of Fig. 2, and at the same time they constitute the primary electrode elements. The rolls 32, 33 are suitably insulated for applying the high frequency electrostatic field, or one of them can be grounded. The dielectric body 31 is provided with semi-conducting surfacing layers or secondary electrode elements 34. In addition suitably-insulated idler rolls 38, or equivalent supports or guides, are provided for the body 31 in its passage between the rolls 32, 33. The rolls 32, 33 can be plain cylinder rolls for applying pressure only or they can be corrugated or otherwise shaped to cut, emboss designs or act as coacting mold parts to compress the body 31 between them into molded articles.

When a high frequency field is applied to the rolls 32, 33 of Fig. 3 and they are simultaneously rotated, the body 31 passes between them. Some charging current flows from roll to roll as illustrated by the arrows. But there is also lateral flow along the semi-conducting surfacing layers 34, with a voltage drop that practically dissipates the entire voltage of the source, if the resistance is sufficiently high, so that at a point X there is practically no loss in the dielectric body; this means a preheating of the material at a progressively increasing rate from the point X toward the contact rolls. By correlating the speed of travel of the body 31 through the rolls with the voltage, frequency and conductivity of the semi-conducting layer, the heating can be controlled to bring the body to the desired temperature at the rolls for applying pressure or for molding. When the continuity of the body 31 upon leaving the rolls is not disturbed by the action of the rolls, there is a gradual decrease in the heating effect as the body departs from the rolls.

Figure 4:
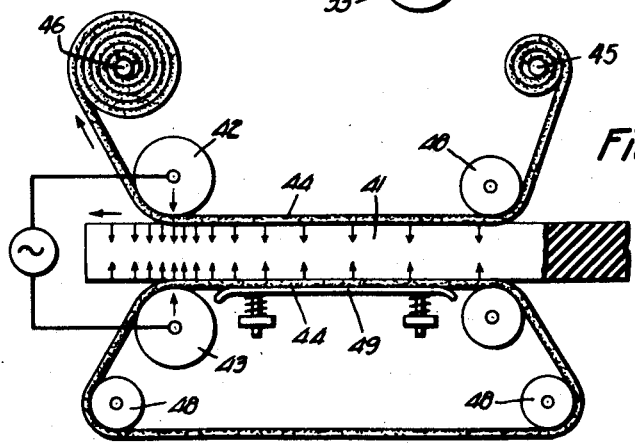
Fig. 4 is a vertical cross-section similar to Fig. 3 but with separable secondary electrode elements.

Fig. 4 illustrates an arrangement similar to Fig. 3, except that the semi-conductive layers are made as separate elements. A continuous body 41 is fed between primary electrode element rolls 42, 43. Between the rolls and the body are separable semi-conducting layers 44 which travel with the body. A layer 44 can be unwound from one spindle 45 and upon another spindle 46, or they can be endless and constrained by idler rolls 48 to maintain the layers in intimate contact with the body for the requisite length of travel and secure the heat distribution explained in connection with Fig. 3. To further insure contact, there can be guide plates 49 held against the layers 44 by springs, weights or other suitable means.

The roll electrode elements can be modified in various ways for heating continuous rods, tubes and other shapes.

In Figs. 5 and 5a there is illustrated a cable 51 having a central conductor 51a and insulation 51b about it; the insulation can be uncured rubber, synthetic elastomer, etc. About the insulation is a semi-conducting layer or coating 54, and the cable passes between primary electrode element rolls 52, 53. As in the embodiment of Fig. 2, the layer 54 can be a graded intermediate annular layer of semi-conducting material either integral with or a separately applied layer about the insulation. In this embodiment the central conductor can be one electrode, and the rolls 52, 53 and layer 54 constitute the other; these are connected to a high frequency source 55. Voltages are applied between the conductor and the rolls, and the cable is pulled between the rolls while subjected to the high frequency field and to pressure; in this manner the insulation can be vulcanized or cured by heating. The layer 54 can remain on the cable to serve as an electrical shield.

With concentric electrodes, as illustrated in Figs. 5 and 5a, the electric field is non-uniform through the dielectric body between the electrodes, being inversely proportional to the distance from the center of the center electrode. This results in a greater concentration of generated heat near the center electrode. Moreover, the outer electrode has much greater area and hence greater heat-radiating capacity. But by the combination of a secondary electrode element with the outer primary electrode, heat can be generated in the secondary element to compensate for radiation from the outer primary electrode and also for the non-uniform distribution of heat within the body by conduction into the body from the secondary electrode element.

Fig. 6 shows the application to curing or heat-treating tubes. A mandrel or rod 62, which can be an extension of a mandrel over which the tube 61 is formed by extrusion, constitutes a primary electrode element. The other electrode element consists of the pressure rolls 63 engaging the outside surface of the tube. About the tube is wrapped a semi-conducting tape 64; the tape can be wound onto the tube at a point distant from the rolls to effect the desired heat-distribution, and after the tube has moved through the rolls, it can then be unwound.

A further modification of pressure rolls acting on a continuous body is shown in Fig. 7. In this case the body 71 has a channel cross-section, and the roll electrodes 72, 73 conform to the cross-section. Semi-conducting sheets or layers 74 are interposed between the rolls and the body for distributing the voltage over the desired area of the body. By this means the dielectric body can be subjected to simultaneous heat and pressure.

A conveying system for carrying bodies through a high frequency field is illustrated in Fig. 8. Flexible belts 86, 87 of insulating material, such as fabric, carry between them the bodies 81 to be heat-treated. Primary electrode elements 82, 83 are placed on the opposite sides of the belts, and the voltage gradient is obtained by the semi-conducting coatings or layers 84 on or forming part of the belt surfaces that face the primary electrode elements. The belts pass over sheaves 88 which are rotated to drive the belts, and additional guides or idler rolls 89 can be provided to maintain the position of and support the belts. Instead of mounting the belts to travel in a horizontal plane, they can be disposed vertically, and a separate conveyor provided to carry the material between them; in this modification the traveling belts form part of the dielectric or insulating material. But the secondary electrode elements can be made with or without a dielectric layer in the form of stationary walls, plates or tubes between or through which the masses are conveyed or propelled by a belt, piston, screw or other conventional means.

The system of Fig. 8 can be used to heat a variety of materials such as tobacco, grains and other granular material, textiles, milk in glass vessels, etc. A particular useful application is that of heating preforms or loose molding powder for subsequent molding in a press or an injection machine. The electrostatic field is established between the primary electrode elements 82, 83; and the secondary semi-conducting elements 84 provide a voltage gradient, as explained above, so that the materials enter and leave the field at points where there is practically no voltage and danger of flash-over or breakdown. In this arrangement the insulating belts, the material being treated and any air gaps which may exist comprise the dielectric that is heated.

Preferably the belts for a system such as that of Fig. 8 are provided with edge insulation as shown in cross-section in Fig. 9. A belt 97 of insulating material has a semi-conducting layer 94 embedded in the middle portion of a surface, leaving at each edge insulation 98, 99; the layer 94 corresponds in width to that of the material 91 being treated. By this construction the body 91 is subjected to electrical stress from an electrode 93 without danger of flash-over.

In Fig. 10 one of the primary electrode elements in conjunction with a secondary element is shown in the core of the body to be heated during molding. For illustration a propeller blade 101 is selected having a central wire or strip 102 surrounded or coated by a semi-conducting layer 104. The molding material is wrapped about the electrode combination, or the latter is placed between laminations of wood or fabric, and the exterior surface given a semi-conducting coating or layer 103. The assembly is then placed in the mold which can be the other primary electrode. The lead from a high frequency source can be brought to the embedded wire through an insulated bushing and the other lead of the energy source 105 connected to ground, with the mold also connected to ground. When a high frequency field is applied, the secondary or semi-conducting electrode elements serve to distribute the voltage, as explained, and so insure against localized overheating or burning during compression.

In the same manner as in Fig. 10, plywood, wall-board and other structures can have embedded primary and secondary electrode elements, which remain in the finished article; and the press-platens, preferably with semi-conducting surfacing on or in the article, comprise the other electrode. By proportioning the areas of the embedded electrode combination to that of the material the heating effect can be controlled, particularly about the edges of the material. A reduction of the embedded electrode area to provide edge insulation is particularly applicable to relatively thin structures, as the danger of flash-over heretofore existent can be eliminated; and proportioning the relative areas of the embedded primary and secondary electrode elements gives a voltage distribution for controlling the heating.

When closed hollow structures are to be heat-treated and also subjected to internal as well as external compression, the internal electrode can be a semi-conducting bag or balloon, or one provided with a semi-conducting surface, which can be expanded against the interior wall of the dielectric body to be treated, and having in contact with the semi-conducting surface a primary electrode element. An illustration of such a construction is Fig. 11 showing in cross-section a rubber tire mold and a tire carcass 111 of varying thickness within the mold. The mold is composed of annular steel sections 112 clamped together by a ring 113. Within the tire body is an annular-shaped expansible bag 114 of semi-conducting rubber secured to annular rings 115a of insulating material, and these are held in place by another insulating annulus 115b engaged by the mold sections 112. A tube 116 of flexible rubber or other material is connected to the annulus 115b for the entry of insulating gas or liquid to the bag to expand the latter. A metal ring electrode element 117 is attached to the interior surface of the bag, and from the ring 117 there extends a lead 118 to an energy source 119; the lead 118 can be carried through the ring 115b at any convenient point, and the other lead 120 from the energy source can be connected to the mold section 112 or to ground as shown.

By the construction illustrated in Fig. 11, the greatest voltage across dielectric is at the thickest part of the tire body, i. e., at the electrode 117. From the electrode there is a voltage drop along the semi-conducting bag to the thinnest parts of the tire body, thus providing a uniform gradient through dielectric to give a corresponding uniformity in the heating.

There are other modifications possible. In general very good or intimate contact with the body to be heated is established, thus eliminating sparking, ozone cutting, etc. A controlled time rate of heating is obtained not only laterally along the semi-conducting layer but also in the direction of the voltage gradient through the body. Also the semi-conducting layer is flexible as a rule and permits manipulations and operations not possible with metallic electrodes alone while insuring the absence of "shorts."

What is claimed is:

1. Electrode for the application of a high frequency electrostatic field to a dielectric comprising in combination a primary element of good conductivity and a secondary element of semi-conductivity in electrical continuity with and extending laterally from the primary element over the dielectric surface.

2. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element forming a surfacing layer of the dielectric.

3. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising a layer of dielectric material having conductive particles distributed therein.

4. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising a layer of dielectric material having conductive particles distributed therein with an increased concentration of particles at the surface of the layer facing the primary element.

5. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising a layer of dielectric material having conductive particles distributed therein with a decreasing concentration of particles in correspondence to the distance from the surface of the layer facing the primary element.

6. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising a film of dielectric material incorporating conductive particles.

7. Electrode for the application of a high frequency electrostatic field to a dieletric comprising in combination a primary element of good conductivity and a secondary element of semi-conductivity of greater area than the primary element in electrical continuity with and extending laterally from the primary element over the dielectric surface, said secondary element comprising a base of insulating material having thereon a film of dielectric material made semi-conductive by the incorporation of conductive particles.

8. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising an insulating belt with a surfacing layer of dielectric made semi-conductoive by the incorporation of conductive particles.

9. Electrode for the application of a high frequency electrostatic field to a dielectric comprising in combination a primary element of good conductivity and a secondary element of semi-conductivity of greater area than the primary element in electrical continuity with and extending laterally from the primary element over the dielectric surface, said secondary element comprising an insulating belt with a surfacing layer of dielectric made semi-conductive by the incorporation of conductive particles, said belt having edge insulation.

10. Apparatus for applying a high frequency electrostatic field to a dielectric comprising in combination a conveyor belt for carrying the dielectric, a primary electrode element in the form of a roll in contact with the belt, said belt having a layer of semi-conductivity on its surface facing the primary element, and a coacting electrode of primary and secondary elements in the form respectively of a roll and a belt having a semi-conductive surfacing layer.

11. Apparatus for applying a high frequency electrostatic field to a dielectric structure having an embedded conductive element, comprising in combination a primary electrode element of good conductivity for external application to the dielectric structure, the embedded conductive element constituting another primary electrode element, and a secondary electrode element of semi-conductivity disposed between said primary elements for securing voltage distribution of an applied field, said secondary electrode element being of greater area than the primary electrode element.

12. Apparatus for applying a high frequency electrostatic field to a cable structure with a central conductor and insulation about the conductor comprising in combination a primary roll electrode element of good conductivity for contacting the insulation, and a secondary electrode element of semi-conductivity between the insulation and the roll electrode element in the form of a continuous surfacing on the insulation, the central conductor constituting the other electrode for applying the field and the secondary electrode element being of greater area than the roll electrode element.

THOMAS F. PETERSON.

REFERENCES CITED

The following references are of record in the file of this patent:

UNITED STATES PATENTS

| Number | Name | Date |
|---|---|---|
| 1,555,258 | Allcutt | Sept. 29, 1925 |
| 2,298,037 | Crandell | Oct. 6, 1942 |
| 2,261,847 | Dufour et al. | Nov. 4, 1941 |
| 1,806,846 | Fox et al. | May 26, 1931 |
| 2,263,681 | Hart | Nov. 25, 1941 |
| 2,291,807 | Hart | Aug. 4, 1942 |
| 2,275,430 | Hart et al. | Mar. 10, 1942 |
| 2,087,480 | Pitman | July 20, 1937 |
| 1,807,105 | Schliephake | May 26, 1931 |

OTHER REFERENCES

Timbie and Bush, "Principles of Electrical Engineering," pages 481 and 482, first edition, 1923, John Wiley & Sons, Inc., N. Y.